(12) United States Patent
Olivier et al.

(10) Patent No.: US 9,664,807 B2
(45) Date of Patent: May 30, 2017

(54) SEISMIC SENSOR

(71) Applicant: ION Geophysical Corporation, Houston, TX (US)

(72) Inventors: Andre W. Olivier, River Ridge, LA (US); Matthew Greco, Metairie, LA (US); Ronald Barry, River Ridge, LA (US)

(73) Assignee: ION GEOPHYSICAL CORPORATION, Houston, TX (US)

( * ) Notice: Subject to any disclaimer, the term of this patent is extended or adjusted under 35 U.S.C. 154(b) by 147 days.

(21) Appl. No.: 14/498,341

(22) Filed: Sep. 26, 2014

(65) Prior Publication Data

US 2015/0098302 A1   Apr. 9, 2015

Related U.S. Application Data

(60) Provisional application No. 61/883,054, filed on Sep. 26, 2013.

(51) Int. Cl.
*G01V 1/38* (2006.01)
*G01V 1/20* (2006.01)

(52) U.S. Cl.
CPC .............. *G01V 1/38* (2013.01); *G01V 1/201* (2013.01); *G01V 2210/3242* (2013.01)

(58) Field of Classification Search
CPC ... G01V 1/38; G01V 1/201; G01V 2210/3242
USPC ...................................... 367/15, 20
See application file for complete search history.

(56) References Cited

U.S. PATENT DOCUMENTS

| | | | |
|---|---|---|---|
| 5,046,057 A * | 9/1991 | Berni | G01V 1/201 367/170 |
| 5,673,330 A * | 9/1997 | Chang | H04R 9/08 381/177 |
| 6,512,980 B1 | 1/2003 | Barr | |
| 6,539,308 B2 | 3/2003 | Monk et al. | |
| 7,167,413 B1 | 1/2007 | Rouquette | |
| 7,239,577 B2 | 7/2007 | Tenghamn et al. | |
| 7,359,283 B2 | 4/2008 | Vaage et al. | |
| 2004/0042341 A1 | 3/2004 | Tenghamn et al. | |
| 2006/0133202 A1 | 6/2006 | Tenghamn | |
| 2007/0297287 A1 | 12/2007 | Robertsson et al. | |
| 2009/0065289 A1 | 3/2009 | Tenghamm | |

(Continued)

FOREIGN PATENT DOCUMENTS

| | | |
|---|---|---|
| EP | 0560558 A2 | 9/1993 |
| GB | 2411722 A | 9/2005 |

(Continued)

OTHER PUBLICATIONS

"International Search Report & Written Opinion", issued Feb. 12, 2015, in PCT Application No. PCT/US2014/057784, 10 Pages.

(Continued)

*Primary Examiner* — Daniel L Murphy
(74) *Attorney, Agent, or Firm* — Dorsey & Whitney LLP

(57) ABSTRACT

A seismic sensor cable system is provided. The seismic sensor cable system may include a cable, a first sensor configured to measure motion of the cable, wherein measurement of motion by the first sensor substantially excludes particle motion associated with seismic waves, and a second sensor configured to measure particle motion associated with the seismic waves.

25 Claims, 10 Drawing Sheets

(56) References Cited

U.S. PATENT DOCUMENTS

2010/0237870 A1* 9/2010 Dodds ..................... G01V 3/16
                                                          324/331
2011/0182140 A1   7/2011 Lambert et al.
2012/0057430 A1   3/2012 Rouquette et al.

FOREIGN PATENT DOCUMENTS

NO    EP 2202540 A2 * 6/2010  ............. G01V 1/201
WO    2011091252 A2    7/2011

OTHER PUBLICATIONS

Elboth, Thomas, "Noise in Marine Seismic Data", Series of Dissertations submitted to the Faculty of Mathematics, and Natural Sciences, University of Oslo, Norway, Ch. 9 removed, 141 pages.
First Examination Report dated Feb. 15, 2017 in connection with Danish Patent Application No. PA 2016 70237, 9 pages.

* cited by examiner

VERTICALLY ORIENTED PARTICLE
MOTION SENSOR
NORMALIZED RESPONSE

SEISMIC SENSOR

CROSS REFERENCE TO RELATED APPLICATIONS

This application claims the benefit of priority pursuant to 35 U.S.C §119(e) of U.S. provisional application No. 61/883,054, filed on Sep. 26, 2013, and entitled "Seismic Sensor," the entirety of which is hereby incorporated by reference for all purposes.

BACKGROUND

Technical Field

The invention relates generally to marine seismic prospecting and in particular to sensor arrangements for gathering seismic data.

Description of the Related Art

In towed marine seismic exploration, a hydrophone array is towed behind a marine vessel near the sea surface. The hydrophones are mounted in multiple sensor cables commonly referred to as streamers. The streamers serve as platforms for the hydrophones. A seismic sound source, also towed near the sea surface, periodically emits acoustic energy. The acoustic energy of interest travels downward through the sea, reflects off underlying structures or subsea strata, and returns upward through the sea to the hydrophone array. Reflected seismic energy arrives at towed-array receive points. The hydrophone array contains many such receive points, and their records contain the upward traveling seismic acoustic wavelet from the seabed at each of the receive points. The hydrophone recordings are later processed into seismic images of the underlying structures.

Noise is a major consideration in towed streamer operations. Noise sources include swell noise and wave noise from the sea surface. Towing the streamer through the water also causes noise. Some of this noise propagates through the streamer and some through the water column itself. The presence of such noise can adversely affect the accuracy of the sub-surface image. Accordingly, what is needed is an improved sensor system for recording seismic data, wherein the sensor system captures the seismic data but substantially rejects noise.

SUMMARY

In a first aspect, a seismic sensor cable system is disclosed. The seismic sensor cable system may include a cable, a first sensor configured to measure motion of the cable, wherein measurement of motion by the first sensor substantially excludes particle motion associated with seismic waves, and a second sensor configured to measure particle motion associated with the seismic waves.

In some implementations, the second sensor is also configured to measure cable motion. The second sensor may be configured to omit cable motion. The first sensor may be coupled to one or more stress members of the cable. The first sensor may be enclosed in a region with pressure and particle motion release boundaries. The first sensor may also be de-coupled from a skin of the cable.

In other implementations, the second sensor is placed in between a pair of streamer components, and wherein the streamer components are clamped to a skin of the cable. It may be the case that a length of a section of the cable defined by the pair of streamer components is selected such that the section resonates at a resonant frequency chosen in relation to the seismic waves. Additionally, the second sensor is coupled to the skin of the cable.

In still other implementations, the first sensor and second sensor are embedded in one or more sensor mounts. The first sensor and second sensor may be inertial sensors. Additionally, the cable may be one of a streamer cable, an ocean bottom cable, and a cable positioned statically at any depth or orientation in a water column.

In a second aspect, a method for collecting seismic data is disclosed. The method for collecting seismic data may include determining a first measurement with a first seismic sensor, wherein the first seismic sensor is configured to measure motion of a platform of a seismic sensor system, wherein measurement of motion by the first sensor excludes particle motion associated with seismic waves, determining a second measurement from a second seismic sensor, wherein the second seismic sensor is configured to measure particle motion, and combining the first measurement and second measurement to generate a noise-attenuated seismic data signal.

In some implementations, the second measurement signal contains platform motion. The second measurement signal may substantially exclude platform motion. The first sensor may be coupled to one or more stress members of a seismic cable. Additionally, the first sensor is de-coupled from the skin of the cable.

In other implementations, the second sensor is placed in between a pair of streamer components and the streamer components are clamped to the skin of the cable. It may be the case that a length of a section of the cable defined by the pair of streamer components is selected so that the section resonates at a resonant frequency chosen in relation to the seismic waves. Additionally, the second sensor may be coupled to the skin of the cable.

In still other implementations, the first sensor and second sensor are embedded in one or more sensor mounts. The first sensor may be enclosed in a region with pressure and particle motion release boundaries. Additionally, the first sensor and second sensor may be inertial sensors.

In a third aspect, an ocean bottom seismic sensor system is disclosed. The ocean bottom seismic sensor system may include a noise sensor configured to measure motion, wherein measurement of motion by the noise sensor substantially excludes particle motion associated with seismic waves, and a particle motion sensor configured to measure particle motion associated with the seismic waves, wherein the particle motion sensor is coupled to a suspension system configured to resonate below a predefined frequency of interest. In some cases, the first sensor and second sensor are configured to have a substantially same response to motion of the cable.

BRIEF DESCRIPTION OF THE DRAWINGS

FIG. 20 illustrates another embodiment wherein the seismic system of FIGS. 7 and/or 17 is implemented in an ocean bottom system, for example, an ocean bottom cable, ocean bottom node, or the like.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
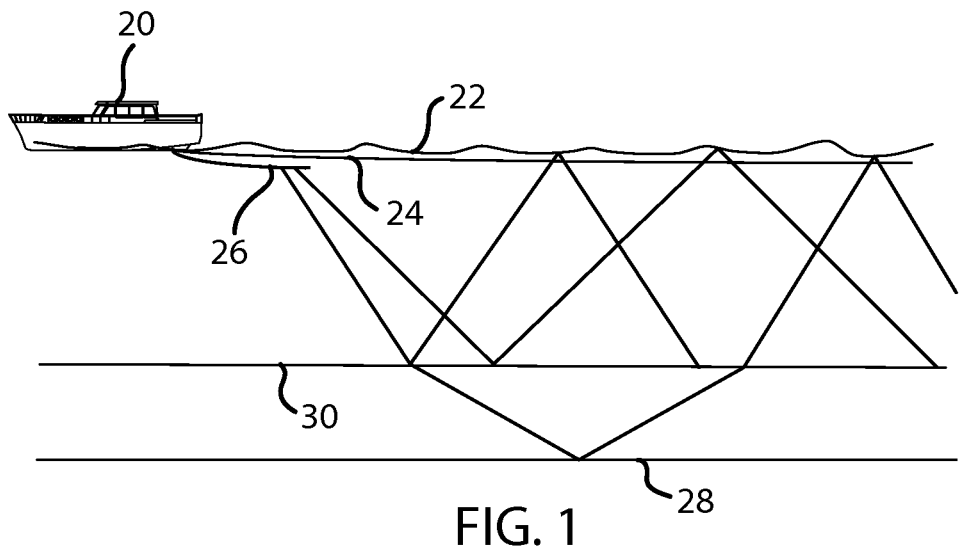
FIG. 1 is an illustration of an exemplary seismic survey according to an embodiment of the invention.

FIG. 1 illustrates an exemplary seismic survey according to an embodiment of the invention. As illustrated a seismic vessel 20 may tow one or more seismic cables 24 at or near a sea surface 22. One or more seismic sources 26 configured to periodically emit acoustic energy may also be towed by the vessel 20. The acoustic energy emitted by the sources 26 may travel through the water column and down to the sea bed 30. A portion of the acoustic energy may be reflected off the sea bed 30, and other portions may travel to underlying structures below the sea bed. The underlying structures, e.g., the structure 28 of FIG. 1, may also reflect the acoustic energy back towards the sea surface 22, as shown in FIG. 1. Acoustic energy reflected from the sea bed and underlying structures may be captured by one or more seismic sensors in the one or more streamers 24.

As mentioned previously, several sources of noise may obscure the signal received by the one or more seismic sensors in the streamers 24. The typical way of dealing with noise sources is to use a combination of temporal and spatial filtering. Temporal filtering is accomplished by discrete digital sampling of the hydrophone signals in time with weighting applied to the samples. The hydrophone channels also include analog filters to prevent aliasing of signals at frequencies greater than half the sample rate. The spatial samples are typically formed by group-summing individual hydrophone outputs so that pressure noise propagating along the length of the streamer is attenuated. This spatial sampling has no impact on noise that propagates in a direction orthogonal to the streamer axis. Typical hydrophone groups consist of eight or so hydrophones in a 12 m section of the streamer.

Acoustic impedance, pc, is the product of the density and the speed of sound in a medium. Reflection of at least some of the sound-wave energy occurs whenever a change in acoustic impedance is encountered by the sound waves. The energy that is not reflected is transmitted (refracted) beyond the boundary between the two regions of different acoustic impedances. The pressure waves are compression waves, which induce particle motion in the direction of propagation.

Acoustic mobility is defined here as the ability of an object to faithfully follow the particle motion of a medium in which it is included. This property is governed by several physical parameters, including (but not limited to) density and size. In particular, an object whose density matches that of its ambient medium, and which is small relative to the wavelength of the particle motion (in the medium), will move in the medium with phase and amplitude matching that of the particle motion (in the medium). An increased density will reduce the object's acoustic mobility, while a decreased density will result in object motion with increased amplitude relative to that of the particle motion in the medium. An object with a relevant dimension that is large compared to the acoustic wavelength will also have reduced acoustic mobility.

At a planar interface between two different homogenous media, a sound wave reflects at an angle equal to the angle of incidence $\theta_1$ and refracts at an angle $\theta_2$. The refraction angle is given by:

$$\theta_2 = \sin^{-1}(c_2 \sin \theta_1 / c_1)$$

The subscript refers to the sound wave moving from medium 1 to medium 2, and $c_1$ and $c_2$ are the speeds of sound in each medium. If the incident angle $\theta_1$ is zero, then the refracted energy propagation path will be at an angle $\theta_2$ of zero.

For an incident angle $\theta_1$ of zero and no energy converted to shear energy, the reflection coefficient at the water-air interface is described by:

$$R_{\rho\rho} = (\rho_2 \cdot c_2 - \rho_1 \cdot c_1)/(\rho_2 \cdot c_2 + \rho_1 \cdot c_1) \approx -1.$$

The reflected energy at the water-air interface is $R^2_{\rho\rho}$, or nearly 1, making the sea surface a near perfect reflector of sound energy. After returning from the sea bottom or the target of interest, the energy is again reflected by the sea surface back to the streamer. Because a typical hydrophone has an omni-directional response, the hydrophone array also records a ghost response, which is the seismic acoustic wavelet reflected from the sea surface and arriving delayed in time and reversed in polarity. The ghost is a downward-traveling seismic acoustic wave that, when added to the desired wave, detracts from the recorded seismic image. The ghost-causing reflection can also continue to the sea bottom or other strong reflector and be reflected back up to again interfere with the desired reflections and further degrade the image. These reflections are commonly referred to as multiples.

For a vertically traveling pressure wave, the ghost produces a notch in the frequency spectrum of a hydrophone response at $f_{notch} = c/(2d)$, where c is the speed of sound and d is the streamer depth. Seismic streamers have been conventionally towed at a depth of 10 m or less. At a depth of 10 m, the notch frequency ($f_{notch}$) is 75 Hz. A frequency response extending beyond 100 Hz is required for high seismic image resolution. Because the notch frequency is inversely proportional to the tow depth, streamers are often towed at shallower depths to improve the resolution of a seismic image. Towing at shallow depths is problematic because noise from the sea surface begins to interfere with the desired seismic signals. These effects are worsened as weather deteriorates, sometimes causing the crew to discontinue operations until the weather improves. The elimination of ghost-notch effects would enable towing at greater depths farther away from surface disturbances.

Figure 2:
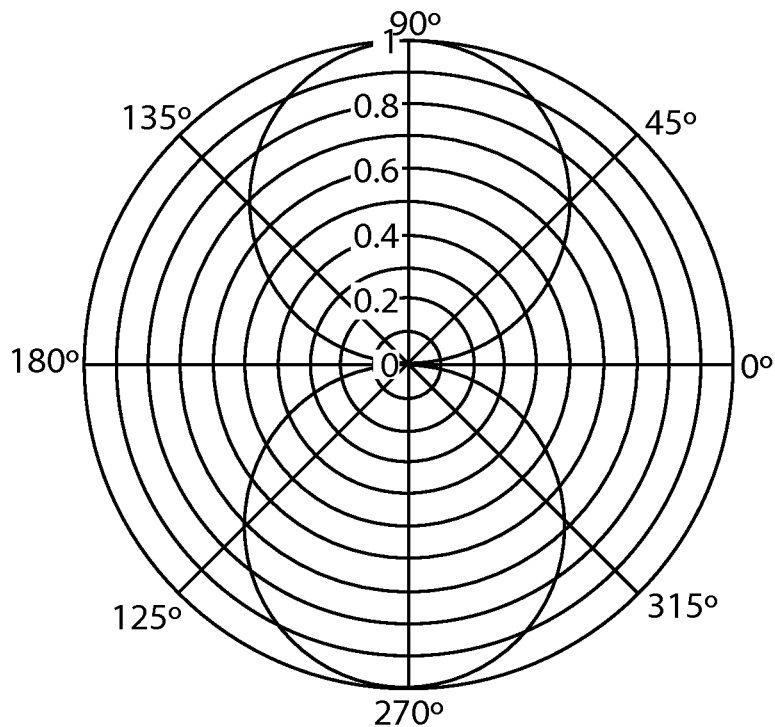
FIG. 2 is a graph showing a two-dimensional representation of a response of a particle-velocity sensor.
Figure 3:
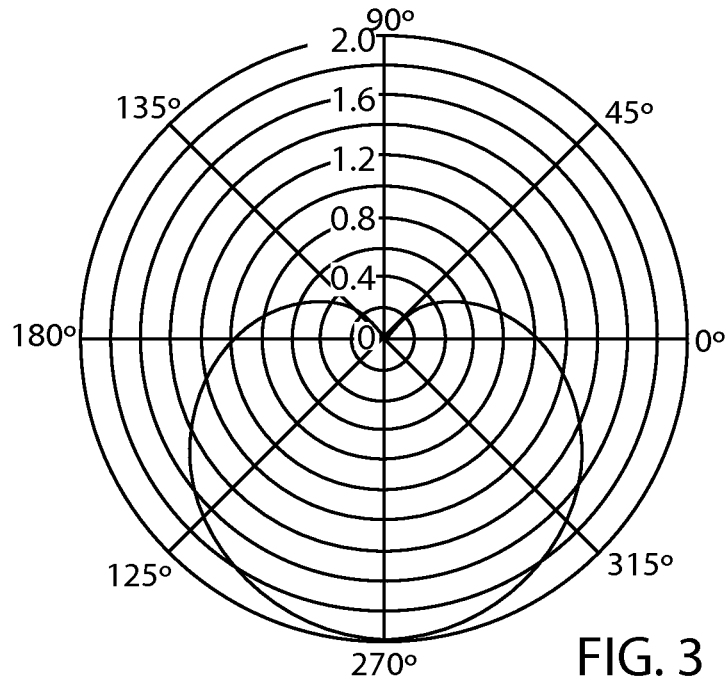
FIG. 3 is a graph showing a two-dimensional representation of a response of an omni-directional hydrophone summed with the response of a vertical particle-motion sensor.

Ocean bottom systems, in which the seismic sensors are placed on the seabed, reject ghosts and multiples by a technique commonly known as p-z summation. In an acoustic wave, the pressure p is a scalar, and the particle velocity u is a vector. A hydrophone, with a positive omni-directional response, records the seismic acoustic wave pressure p. A vertically oriented geophone or accelerometer records the vertical component of the seismic acoustic-wave particle velocity $u_z$, with a positive response to up-going signals and a negative response to down-going signals. In p-z summation, the velocity signal is scaled by the acoustic impedance pc of seawater before it is added to the pressure signal. If an accelerometer is used, its output signal can be integrated to obtain the velocity signal, or the hydrophone signal can be differentiated so that it can better spectrally match the accelerometer. This combination of signals produces a compound sensor that has a full response to the upward traveling wave and at least a partially muted response to the downward traveling wave to reject the ghost and multiples. One such method of signal conditioning and combination of signals to get a single de-ghosted trace is described in U.S. Pat. No. 6,539,308 to Monk et al. FIG. 2 is a two-dimensional (2D) representation of the response of a particle-velocity sensor. FIG. 3 is a 2D representation of the response of an omni-directional hydrophone summed with the response of a vertical particle-motion sensor. The full three-dimensional responses can be envisioned by rotating the 2D responses about their vertical axes.

Figure 4:
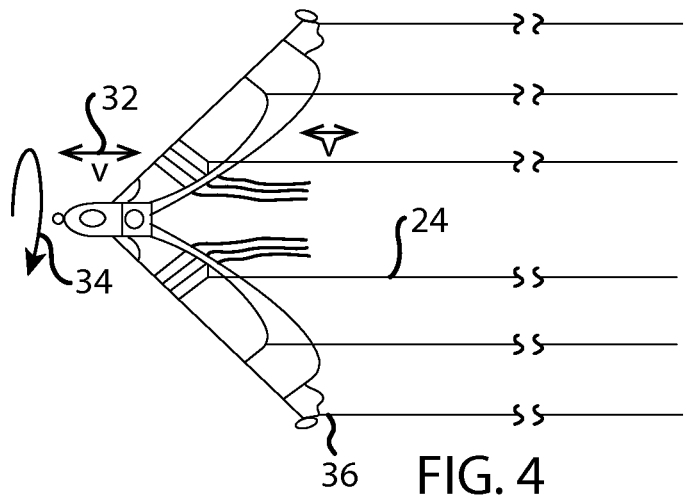
FIG. 4 depicts energy being imparted to streamers by speed variations and by yawing motion.
Figure 5:
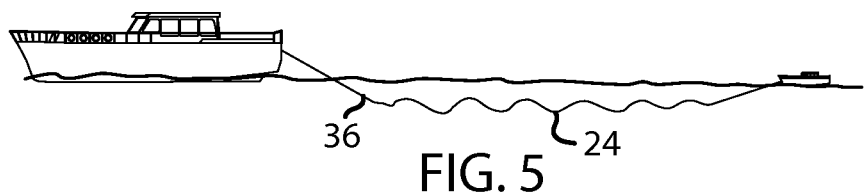
FIG. 5 is a side view depicting energy-induced accelerations and transverse waves in a streamer.
Figure 6:
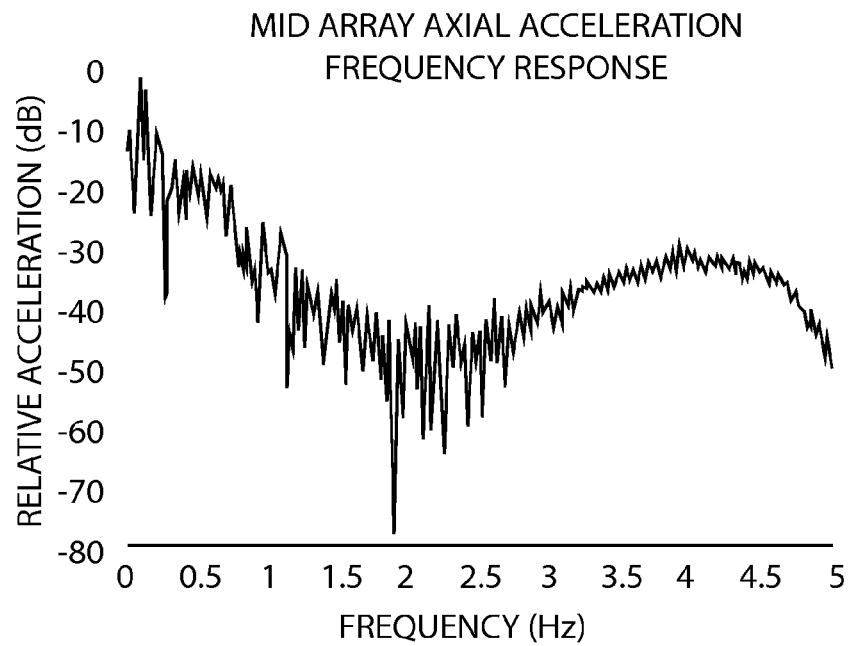
FIG. 6 shows a computational model of the frequency response of typical cable axial accelerations in the middle of a streamer.

Recently there has been interest in using techniques similar to p-z summation in towed-streamer acquisition to allow deeper tows without interference from ghost-notch reflections. Operating a particle-motion sensor in a seismic streamer presents a problem because the streamer experiences accelerations due to towing or sea surface effects that are large compared to accelerations caused by the desired seismic reflections. Moreover, these unwanted accelerations are in the same spectral band as the desired seismic response. When a towing vessel encounters ocean waves, there are small perturbations in the speed of the vessel. The vessel also typically undergoes a yawing motion. FIG. 4 depicts energy being imparted to the streamers 24 by speed variations 32 and by yawing motion 34. FIG. 5 is a side view depicting energy-induced accelerations and transverse waves in the streamer 24. (The energy's effect on the streamer is exaggerated in FIG. 5 for illustrative purposes.) Most of the energy is attenuated by elastic stretch members 36, typically in front of the sensing arrays. While the energy is greatly attenuated, some does remain. Accelerations caused by planar pressure waves due to the desired seismic reflections are given by:

$$a = p \cdot 2 \cdot \pi \cdot f/Z,$$

where p is the acoustic pressure amplitude, f is the frequency, and Z is the acoustic impedance. Performance of a particle-velocity measuring system should be near the ambient noise limits. Typically, seismic-data customers require ambient noise from streamer hydrophone systems to be below 3 μbar. Since the acoustic impedance of seawater is 1.5 MPa·s/m, a 3 μbar pressure wave at 4 Hz produces particle accelerations of roughly 0.5 μg. FIG. 6 shows a computational model of the frequency response of typical cable axial accelerations in the middle of a streamer. The presence of a secondary peak at 4 Hz, only 1.5 orders of magnitude below the primary peak, indicates that, in some cases, the cable dynamic motion can be greater than the seismic signal to be measured.

U.S. Pat. No. 7,167,413 to Rouquette uses an accelerometer in a seismic streamer to reject the ghost-notch effect. Rouquette uses a mass-spring system to reduce the effect of cable dynamics on the accelerometer and a load-cell system to measure and reject the cable-motion-induced noise on the accelerometer. The Rouquette system relies on well-known complex mechanical relationships that do not remain constant with manufacturing tolerances, aging, and environmental conditions. Rouquette uses a signal-processing adaptive algorithm to derive the relationship of the load-cell-sensor-and-mass-spring system to the acceleration acting on the accelerometer in situ. Rouquette describes a complex mechanical and electronic system.

U.S. Pat. No. 7,239,577 to Tenghamn et al. describes an apparatus and method for rejecting the ghost notch using an acoustic-wave particle-velocity sensor. Tenghamn et al. teaches the use of a fluid-damped, gimbaled geophone. It is known in the art that the fluid encapsulating the geophone is chosen to provide damping of the sensor swinging on its gimbals. While not described in Tenghamn et al., it is known in the art that a mass-spring vibration-isolation system can reduce the effect of cable mechanical motion on the geophone response. Motion of the geophone caused by cable mechanical motion is indistinguishable from acoustic-wave particle motion in the geophone response. While the method of Tenghamn et al. reduces the effect of this type of noise, the reduction is insufficient to completely prevent the desired seismic-wave particle motion from being obscured by cable mechanical motion. This technique also gives the response similar to the ideal cardioid in FIG. 3, but there are still undesired signals coming from the surface and being induced by streamer excitation along the streamer axis.

U.S. Pat. No. 7,359,283 to Vaage et al. describes a method of combining pressure sensors and particle-motion sensors to address the impact of mechanical motion on the particle-motion sensors. In this method, the response of the particle-motion sensor below a certain frequency is not used, but only estimated from the pressure-sensor response and the known pressure-sensor depth. The frequencies rejected are those for which mechanical motion of the streamer is expected. The estimated response has poor signal-to-noise ratio at the lower frequencies of interest. This rejection below a certain frequency is not optimal as it also rejects valid signals in an important low-frequency band where deep-target data is likely to exist.

While these patents all describe methods to reject the ghost notch in a seismic streamer, none adequately addresses the effects of streamer tow and other noise that affect the particle-motion sensor or hydrophone measurements. All also fall short of producing high-fidelity, sensed acoustic-wave components with good signal-to-noise ratio down to the lowest frequencies of interest.

Figure 7:
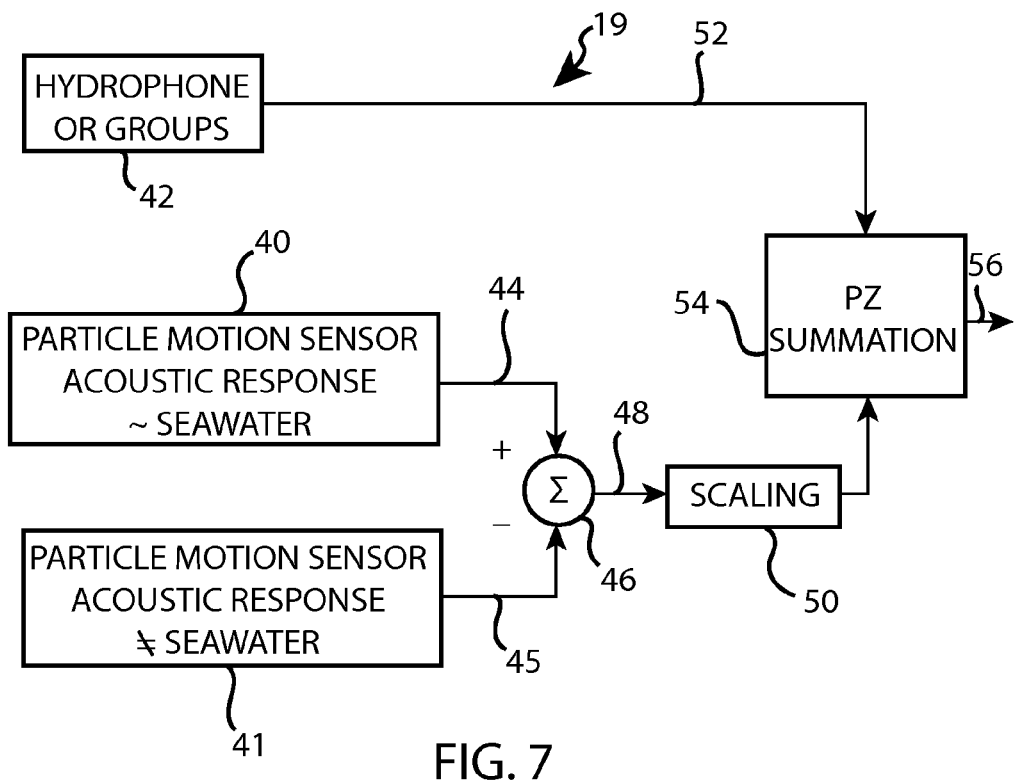
FIG. 7 is a block diagram of a general version of an underwater seismic system embodying features of the invention.

FIG. 7 is a block diagram of a general version of an underwater seismic system 19 embodying features of the invention, which comprises techniques for using motion sensors, or sensor assemblies, with different responses to sound-wave-induced signals and similar responses to platform, e.g., streamer, cable, or autonomous node, motion to improve the signal-to-noise ratio of data acquired for seismic imaging. In FIG. 7, two motion sensors 40, 41 and one pressure sensor 42, generally a hydrophone, provide signals that are combined to produce a noise-reduced and de-ghosted signal. A group of pressure sensors can be used in lieu of a single sensor, e.g., to reduce the noise arising from pressure waves propagating along the streamer axis. The motion sensors ideally are dc-sensitive and are capable of resolving the gravity vector; otherwise, an additional orientation sensor is used.

The first motion sensor 40 has a response to acoustic waves that is ideally, but not necessarily, equal to that of seawater; its response may be increased beyond that of seawater if more gain is desired. The second motion sensor 41 has a response to acoustic waves that is measurably different from that of the first motion sensor 40. This difference in acoustic response can be realized by means of a difference in the material composition or the geometric configuration of the sensors. In all versions of the system, the construction (material and geometric properties) and implementation of both sensors are chosen so that their mechanical responses to platform motion are matched. For example, if each motion sensor is designed to interact with a cable in the same way as a second-order mass-spring system, then the masses (including added mass, if appropriate) of the sensors and their associated spring and damping constants are made equal. Alternatively, local or remote processing algorithms may be used to mathematically match the sensors' responses to platform motion. Examples of methods for matching sensor responses to platform motion are described in copending U.S. Application 61/785,354 filed on Mar. 14, 2013, titled "Seismic Sensor System with Streamer Noise Rejection", which is incorporated herein in its entirety.

The first and second outputs 44, 45 of the first and second motion sensors 40, 41 are subtracted 46, either locally or after remote processing, to produce a reduced-noise response signal 48 indicating particle motion due to acoustic waves with platform motion attenuated. The subtraction block 46 constitutes one means for combining the first sensor signal and the second sensor signal. If the signal of one of the sensors is reversed in phase, the means for combining the first sensor signal and the second sensor signal would be realized as an addition block instead. The reduced-noise response is scaled 50 to match the pressure-sensor response 52, e.g., the hydrophone signal, and used in p-z summation means 54 to produce a final output signal 56 that also rejects ghost notches and multiples. The means for combining the first sensor signal and the second sensor signal and the p-z summation means may be realized locally by analog circuitry, by digital logic circuitry, or algorithmically in a microprocessor, remotely in a shipboard computer or in off-line data processing.

Figures 8, 9:
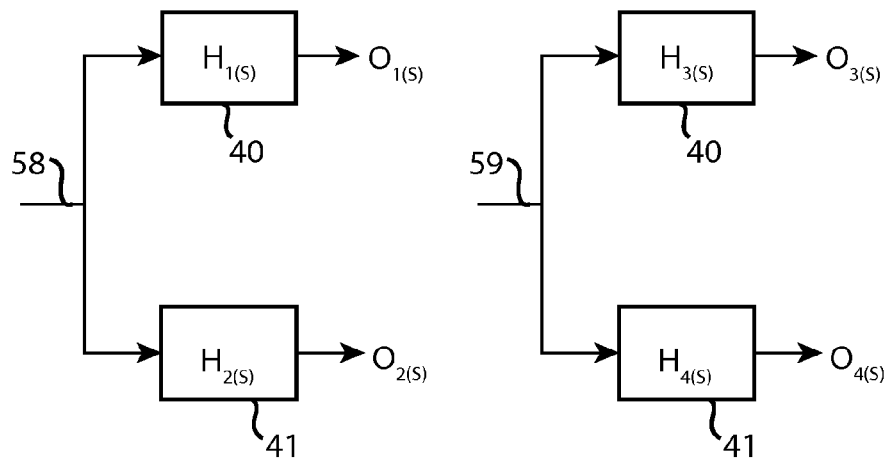
FIG. 8 is a block diagram of the two motion sensors of FIG. 7 in the frequency domain indicating their transfer functions to the acoustic wave component of incident energy.
FIG. 9 is a block diagram of the two motion sensors of FIG. 7 in the frequency domain indicating their transfer functions to the platform-motion component of incident energy.

FIG. 8 is a block diagram of the two motion sensors 40, 41 of FIG. 7 in the frequency domain indicating their transfer functions to the acoustic wave component 58 of incident energy. The acoustic wave component includes the seismic signals of interest. The first sensor 40 and the second sensor 41 have unequal acoustic wave transfer functions $H_1(s)$ and $H_2(s)$. The transfer function $H_1(s)$ is sensitive to acoustic wave particle motion, so that the first sensor 40 produces an output response $O_1(s)$ that represents particle motion. The transfer function $H_2(s)$ is insensitive to acoustic wave particle motion, and the second sensor 41 produces an output response $O_2(s)$ that does not include the motion of surrounding acoustic-medium particles. FIG. 9 is a block diagram of the two motion sensors 40, 41 of FIG. 7 in the frequency domain indicating their transfer functions to the platform-motion component 59 of incident energy. The transfer functions $H_3(s)$ and $H_4(s)$ of the two motion sensors 40, 41 to platform motion are proportional (or equal) in magnitude, but could be opposite in phase. Thus, both sensors 40, 41 have similar output responses $O_3(s)$ and $O_4(s)$ to platform motion. The composite transfer functions of the first and second motion sensors 40, 41 to incident energy are the combinations of $H_i(s)$ and $H_3(s)$ for the first sensor and of $H_2(s)$ and $H_4(s)$ for the second sensor. The composite responses of the two sensors are the combinations of $O_1(s)$ and $O_3(s)$ for the first motion sensor and of $O_2(s)$ and $O_4(s)$ for the second motion sensor.

Figure 10:
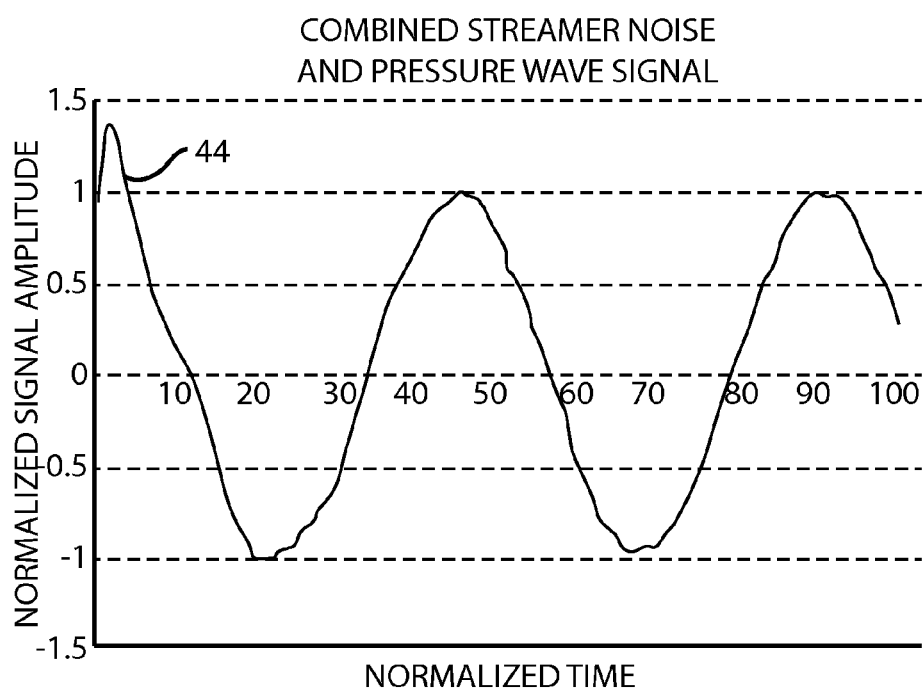
FIG. 10 is an example representation of the time-domain response of a first sensor embodiment to incident energy that includes both platform motion and acoustic waves.
Figure 11:
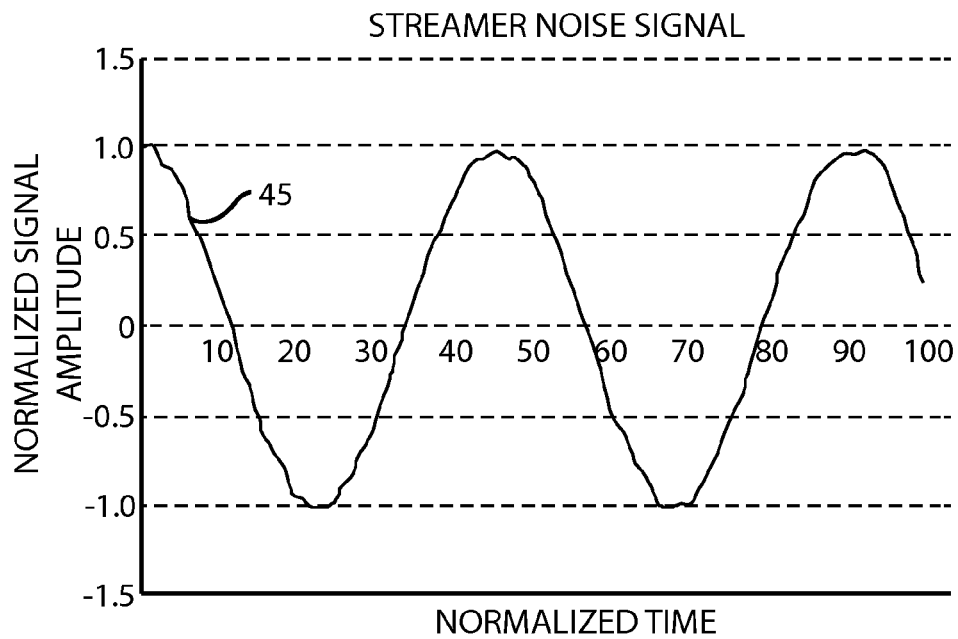
FIG. 11 is an example representation of the time-domain response of a second sensor embodiment to incident energy that includes both platform motion and acoustic waves.
Figure 12:
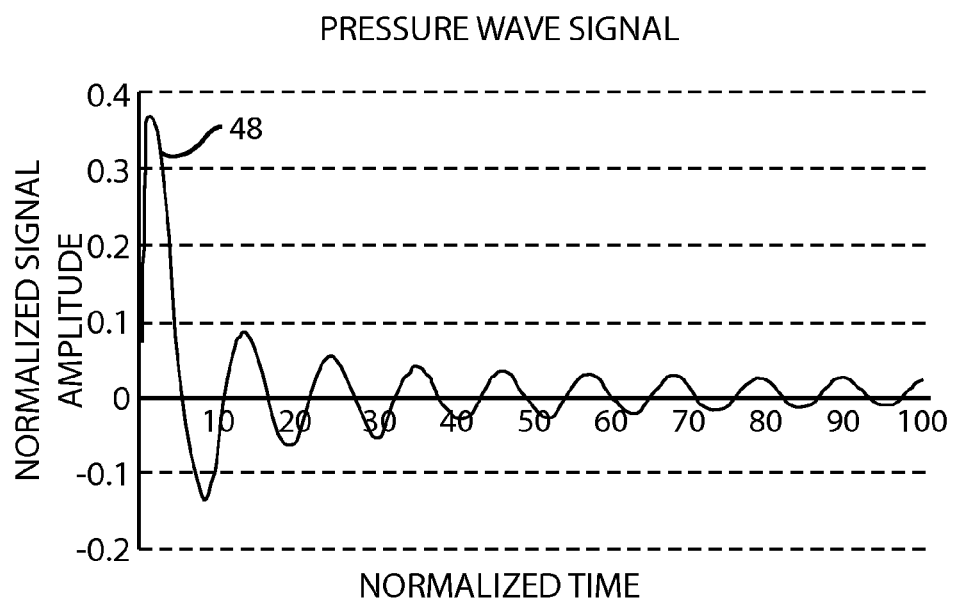
FIG. 12 plots the result of combining the responses of the two sensors embodiments by subtracting the output of the second sensor from the output of the first sensor to produce the noise-subtracted acoustic wave signal of FIG. 7.

FIG. 10 is an example representation of the time-domain response of the first sensor 40 to incident energy that includes both platform motion and acoustic waves. The first sensor's response 44 is sensitive to both platform noise and the acoustic wave. FIG. 11 is the corresponding response of the second sensor 41 to the same incident energy. The second sensor's response 45 is sensitive only to the platform-noise component of the incident energy. FIG. 12 plots the result of combining the responses of the two sensors by subtracting the output 45 of the second sensor from the output 44 of the first sensor to produce the noise-subtracted acoustic wave signal 48 of FIG. 7. Although, for purposes of simplifying the description, the response of the second sensor to pressure waves was treated as zero, it may have some slight response, or even a negative response, to pressure waves. Furthermore, the first and second sensor outputs may not be exactly matched to streamer vibrations. But, even in these instances, the signal subtraction still results in an acoustic wave response with a greatly attenuated platform-motion response that can be scaled and combined with the hydrophone data by p-z summation.

Various specific versions of the general system indicated in the block diagrams of FIGS. 7-9 use different levels of acoustic impedance and acoustic mobility to achieve the desired difference in response to acoustic wavelets. As described above, the two motion sensors 40, 41 and the pressure sensor 42 are mounted in, on, or to a platform. For example, they may be enclosed in an underwater streamer or mounted inside a cable-positioning bird attached to a streamer. The motion sensors are isolated acoustically from each other, but are located close together and separated into individual regions by a divider, for instance. The first motion sensor is enclosed in a first region with an exterior that is free to move and whose acoustic impedance is similar to that of the surrounding seawater so that acoustic pressure and particle motion waves penetrate the exterior with minimal reflections and act on the sensor. The second motion sensor is located in an acoustically opaque and rigid enclosure in a second region and is not affected by incident acoustic waves. The stress member or stress members, being under tension, may have a small and erratic response to the acoustic waves. Any response of the streamer stress member(s) to the acoustic waves is recorded as platform motion. Therefore, the first sensor has a proportional response to acoustic waves; and the second sensor has a negligible response. Additionally, the sensor assemblies are calibrated to have matched responses to platform motions, (e.g., streamer vibrations), for instance by equating their masses (including added mass, if appropriate) and associated spring constants if they behave as second-order mass-spring systems. Subtraction, either locally or after remote processing, of the second sensor signal from the first sensor signal accordingly yields the desired acoustic wave signal at nearly full strength and with greatly attenuated streamer-motion response. Additionally, the sensor assemblies are calibrated to have matched responses to platform motions, (e.g., streamer vibrations), for instance by equating their masses (including added mass, if appropriate) and associated spring constants if they behave as second-order mass-spring systems. Alternatively, local or remote processing algorithms may be used to mathematically match the sensors' responses to platform motion.

Figure 13:
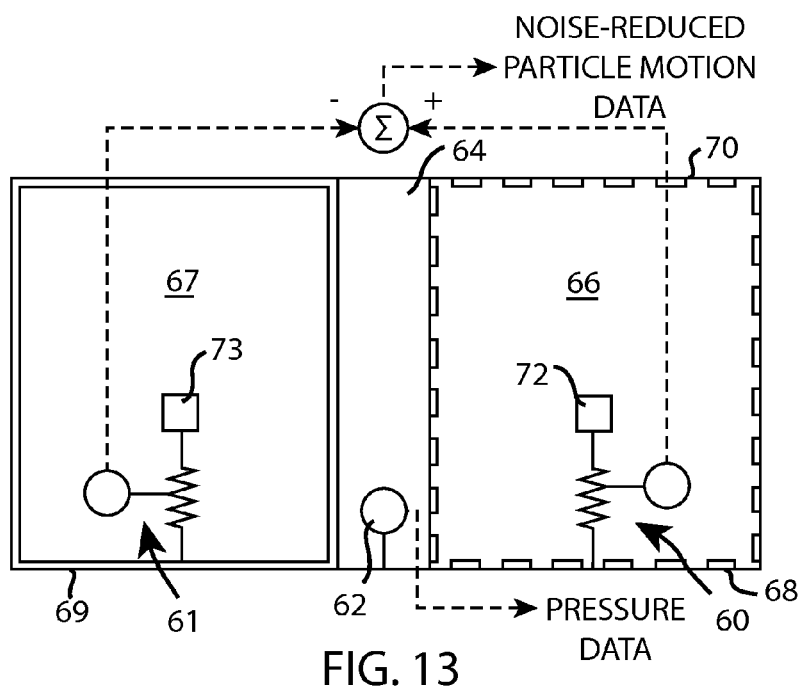
FIG. 13 shows one specific version of the seismic system of FIGS. 7-9 with two motion sensors that are separated acoustically by a central divider and a pressure sensor.

One specific version of the seismic system of FIGS. 7-9 is shown in FIG. 13 with two motion sensors 60, 61—separated acoustically by a central divider 64—and a pressure sensor 62. The first motion sensor 60 is contained in a first region 66 of a seismic platform (such as a streamer, cable, or node) with a rigid, acoustically transparent exterior 68. For example, the exterior 68 is a perforated, rigid housing covered with a flexible, acoustically transparent skin 70. The perforations can be sized as necessary. The interior of the first region 66 is filled with fluid. Ideally, the skin and fluid both have acoustic impedances equal to that of the surrounding seawater. A first test mass 72 with an acoustic response ideally, but not necessarily, equal to that of the fluid is suspended in the fluid; its response may be increased beyond that of seawater if more gain is desired. The first test mass 72 is connected to the exterior of the streamer by means of a displacement, velocity, or acceleration sensor, which serves as the motion sensor. The first sensor 60 uses the exterior of the streamer as a frame of reference and acts as a spring in coupling the test mass and streamer dynamically. The first sensor can be single crystal or a PZT bender, for instance. If the sensor is a single-axis sensor, multiple test-mass systems can be used to form a tri-axis sensor, with all test masses calibrated to match in both acoustic and dynamic response. An alternative for multi-axis measurement is to connect several sensors to a common test mass for multi-axis measurement as long as the mass sensor responses can be kept independent. The second sensor 61 and a second test mass 73 are connected in an assembly in a second region 67 on the opposite side of the divider from the first region 66. The second sensor's assembly differs from the first sensor's in that its rigid housing exterior 69 has an acoustic impedance much greater than that of the surrounding seawater and its interior 67 is filled with air to account for any non-negligible elasticity in the housing exterior 69. Augmenting the effects of the increased acoustic impedance of the second sensor's housing is its rigidity, which allows the housing to act as an acoustic shield, analogous to a Faraday cage in electromagnetism. The acoustic impedance of the second housing exterior 69 is set with a material having a suitably high density or sound speed. The test mass, spring constant, and damping coefficient can be matched either mechanically or mathematically.

Figures 14A, 14B:
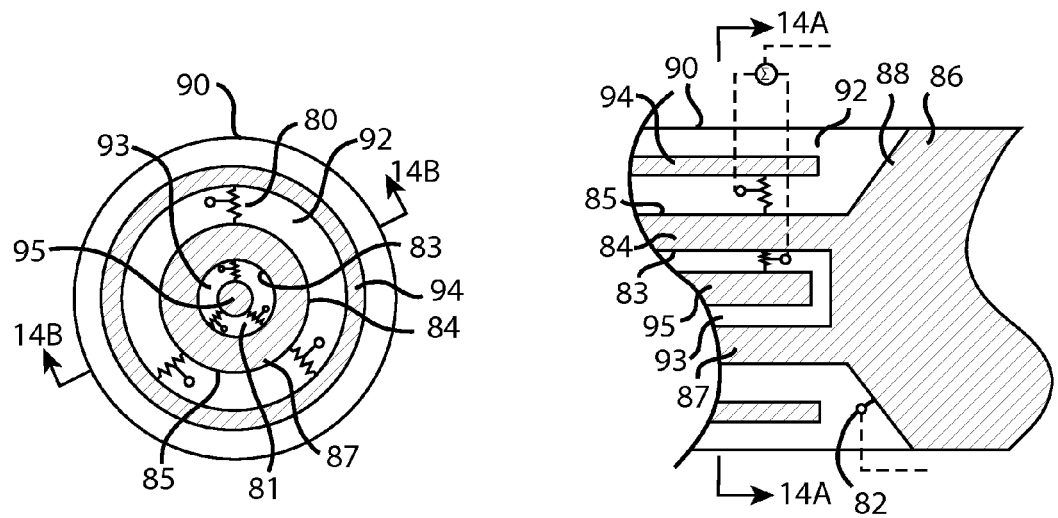
FIGS. 14A and 14B show another version of a seismic system embodying the invention that includes with two sets of motion sensors and a pressure sensor.

Another version of a seismic system embodying the invention is shown in FIGS. 14A and 14B with two sets 80, 81 of motion sensors and a pressure sensor 82. In this version, the first sensor set 80 and the second sensor set 81 are connected to a single rigid body 84 that carries vibrations. This rigid body can be part of a streamer, cable, or node, for example. The rigid body has a large-diameter first portion 86, a smaller-diameter second portion 87, and a transition section 88 joining the first and second portions. The smaller-diameter portion 87 is tubular in shape with an inner side 83 and an outer side 85. The first sensor set 80 encircles a section of the second portion 87 of the rigid body 84 and is connected to its outer side 85. Three or more individual sensors may be used to constitute the first set 80. If axisymmetry is not employed, then the first sensor set 80 is instead located alongside the rigid body. An acoustically transparent exterior 90, which may consist of a flexible membrane over a perforated, rigid housing (with the perforations sized as necessary), separates the sensor system from the surrounding seawater. A first cavity 92, between the second portion 87 of the rigid body 84 and the exterior 90, is filled with fluid. Ideally, the exterior 90 and the fluid have acoustic impedances equal to the acoustic impedance of the surrounding seawater. A first test mass 94, with acoustic properties like those of the first test mass in FIG. 13, is suspended in the first cavity 92 and encircles the second portion 87 of the rigid body 84. The first test mass 94 is coupled mechanically to the outer side 85 of the rigid body 84 by the first set 80 of motion sensors with properties like those of the first sensor 60 in the version of FIG. 13, but with the rigid body 84 as their frame of reference. A second cavity 93 is contained entirely within the tubular second portion 87 of the rigid body 84. The second cavity 93 contains a second test mass 95 suspended in fluid and coupled to the rigid body 84 by the second set 81 of motion sensors connected to the inner side 83 of the rigid body. The dynamic response of the second set 81 of sensors is calibrated to have a response to streamer vibrations that matches the response of the first set 80. Unlike the first test mass 94, however, no requirements are placed on the acoustic response of the second test mass 95. The rigid body 84 itself acts as an acoustic shield to the second sensor set 81 and is composed of a material with relatively high acoustic impedance. A benefit of this coaxial arrangement is that multiple individual sensors respond to the accelerations of each test mass. Combining the output signals of the motion sensors leads to a more robust estimate of the actual acceleration values. As depicted, the first and second sensor sets 80, 81 are sensitive to radial motion; an additional test-mass-sensor system may be included in each cavity in alignment with the streamer axis if tri-axis sensitivity is needed.

Figure 15:
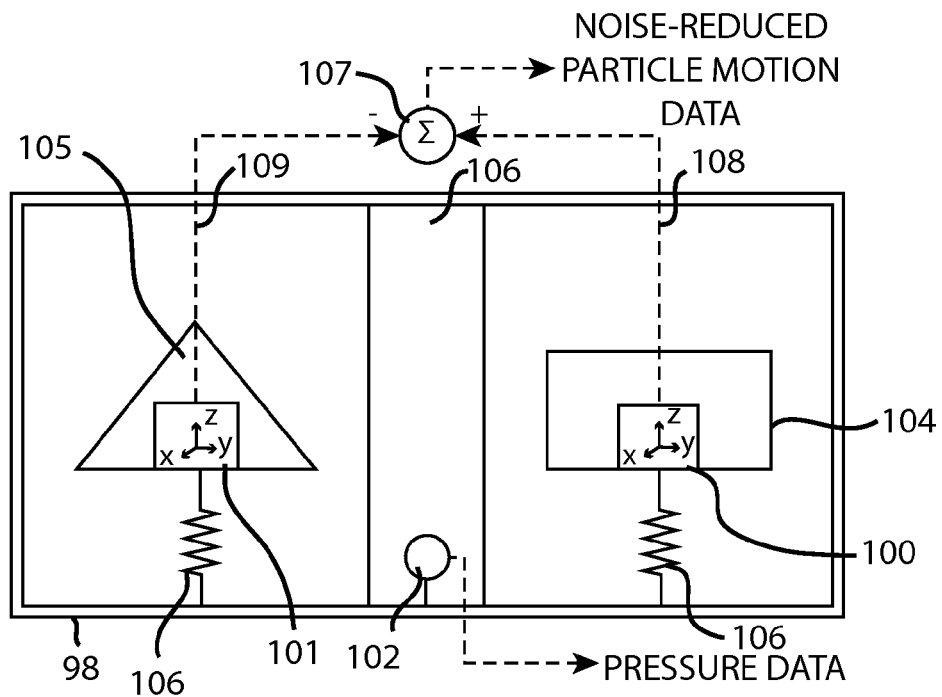
FIG. 15 shows yet another a seismic system embodying features of the invention.

Yet another version of a seismic system is shown in FIG. 15. A seismic platform with a rigid, acoustically transparent exterior 98 has two motion sensors 100, 101, such as dc-sensitive, tri-axis accelerometers, and one pressure sensor 102, such as a hydrophone. The exterior 98 may comprise, for instance, a perforated, rigid housing covered with a flexible, acoustically transparent skin. The perforations can be sized as necessary. The accelerometers can be realized by microelectromechanical system (MEMS), PZT, single crystal, or any other technology with similar utility. The motion sensors 100, 101 are rigidly mounted to first and second rigid housings 104, 105 to enable direct measurement of any dynamic streamer motion. Both sensors are coupled acoustically to the cable exterior 98, but are isolated acoustically from each other, for instance, by a central divider 106. Each of the first and second housings 104, 105 is constructed such that the mass of the first housing plus the mass it encloses equals the mass of the second housing plus the mass it encloses. The dynamic couplings 106 between the housings and the streamer exterior 98 are designed to act as second-order mass-spring systems with equal spring constants and damping, so that the equality of the mass-spring relationships is preserved. On the other hand, the housings have different acoustic mobility levels, so that they generate different responses to acoustic pressure waves. Specifically, the first sensor 100 generates a first sensor signal 108 that is a good representation of the acoustic particle motion; the second sensor 101 produces a second sensor signal 109 that is largely insensitive to acoustic waves. The sensor housings are constructed with different geometries, and possibly also with different materials, to ensure the different cross-sections and, thus, different transfer functions for each sensor. The second sensor signal 109 is subtracted 107 from the first sensor signal 108 either locally or after remote processing, to provide the desired pressure wave signal with greatly attenuated response to streamer motion. Open-cell foam can be used, for example, to serve as the dynamic coupling 106 between each housing 104, 105 and the exterior 98. Filled with a fluid calibrated to match the acoustic impedance of the surrounding seawater, the foam can serve also as a transparent acoustic coupling. For objects that are large relative to the wavelengths of interest, acoustic cross-section could refer to shape and size, as those properties alone would be enough to ensure a difference in sensor response. For small objects, a difference in acoustic cross-section would likely involve a difference in density. In this example, the first housing 104 is sealed with respect to the fluid and filled with air to account for any non-negligible elasticity in the housing; and the second housing 105 is perforated or slotted and allowed to fill with the surrounding fluid. The resultant disparity in overall density between the housings accounts for their different responses to incident pressure waves.

Figure 16:
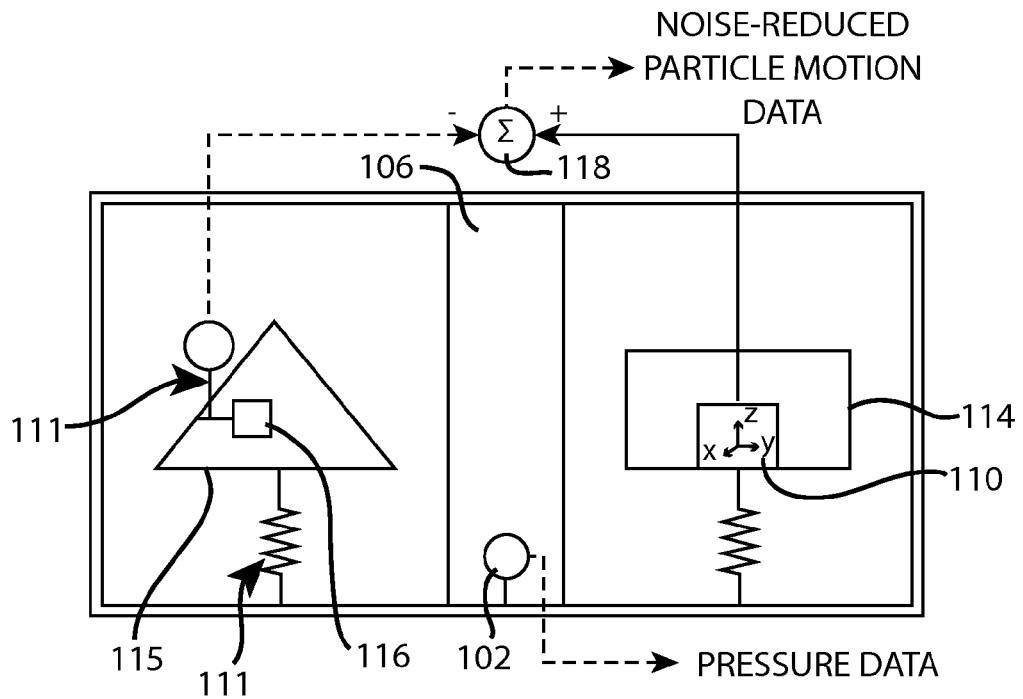
FIG. 16 shows a modified version of the seismic system of FIG. 15 that is intended to enhance the overall gain of the system.

A modified version of the seismic system of FIG. 15 intended to enhance the overall gain of the system is shown in FIG. 16. The first sensor 110 behaves acoustically and dynamically like the first sensor 100 in FIG. 15. The second sensor 111 produces a response to pressure waves that matches that of the first sensor 110 and a streamer-motion response equal in magnitude but opposite in polarity to that of the first sensor. The first housing 114 and the second housing 115 are constructed as in FIG. 15, particularly in terms of acoustic cross-section and density, so that they have a similar mass-spring response to cable motion, but a measurably different response to incident acoustic pressure waves. The second housing 115 additionally includes a test mass 116 that is designed to oscillate in a fluid and have an acoustic wave response matching that of the first housing 114. On the other hand, the response of the test mass to streamer motion is much less than that of the housings because the test mass is isolated from its housing by a second spring system. The test mass 116 is connected non-rigidly to the second housing 115 by means of a displacement, motion, or acceleration sensor 111 that uses the second housing as a frame of reference. This connection should have a resonant frequency lower than the peak frequencies of the streamer motion, so that its response to platform motion is reduced. Multiple accelerometers can be employed to form a tri-axis sensor, with each test mass calibrated to match the acoustic response of the first housing 114 in its respective axis. Pressure waves, which impart motion on the test mass 116, but not on the second housing 115, are therefore detected positively, i.e., in phase. So acoustic particle motion signals from the first sensor 110 and the second sensor 111 match in both magnitude and sign. Conversely, streamer vibrations, which influence the second housing 115, but to a lesser extent the test mass 116, are detected negatively, i.e., opposite in phase. So vibration signals from the sensors match in magnitude, but have opposite signs. In this case the signals from the two sensors 110, 111 are combined by addition 118, rather than subtraction, to produce a greatly diminished streamer-motion response and a simultaneous increase in gain of the acoustic wave response. Alternatively, another test mass in the first housing 114 could be used. But, because the first sensor signal would also be reversed in polarity, it would have to be combined with the second sensor signal by subtraction rather than addition.

Figure 17:
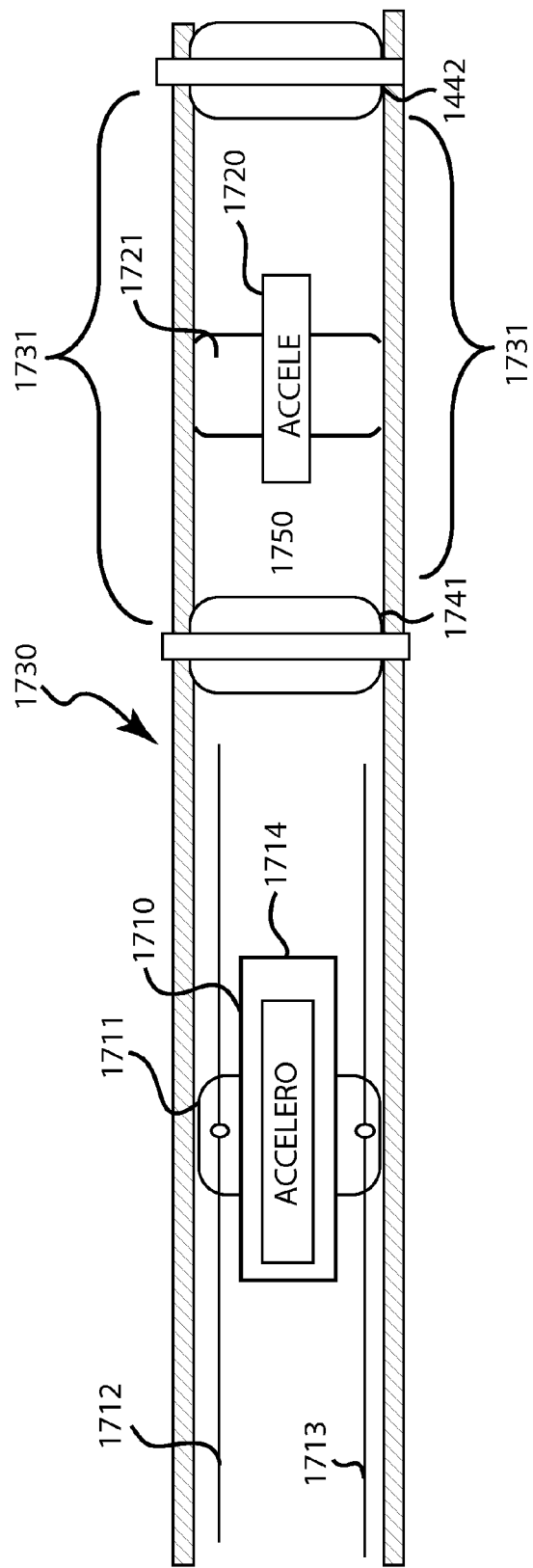
FIG. 17 illustrates another exemplary embodiment of the seismic sensor system according to an embodiment of the invention.

FIG. 17 illustrates another exemplary embodiment of the seismic sensor system according to an embodiment of the invention. In particular, a streamer noise sensor 1710 and a particle motion sensor 1720 are shown within a streamer skin 1730. In one embodiment, the streamer skin may be made from an acoustically transparent medium. Exemplary acoustically transparent mediums include polyurethanes, among others. More generally, acoustically transparent materials may include any material that allows seismic acoustic waves to pass through with minimal alteration to the waves.

In one embodiment, the streamer noise sensor 1710 and the particle motion sensor 1720 may correspond to the sensors 41 and 40 respectively, illustrated in FIG. 7. In other words, the streamer noise sensor 1710 may be configured to measure, either directly or indirectly, motion of the seismic streamer (or noise), whereas the particle motion sensor 1720 may be configured to measure, either directly or indirectly, motion of particles in the sea water at or near the streamer. In one embodiment of the invention, both the streamer noise sensor 1710 and the particle motion sensor 1720 may be inertial sensors configured to measure one or more of acceleration, tilt, shock, vibration, rotation, at multiple degrees of freedom.

The streamer motion sensor 1710 may be a high fidelity sensor. In other words, the streamer motion sensor 1710 may be configured to measure the streamer motion while excluding completely, or at least substantially, any measurement of particle motion at or near the streamer sensor 1710 caused by seismic acoustic waves. In one embodiment of the invention, the sensor 1710 may be either directly or indirectly coupled to at least one stress member of the streamer cable. For example, as illustrated in FIG. 17, the sensor 1710 (or a housing comprising the sensor 1710) may be embedded in a sensor mount 1711. The sensor mount 1711 may be made from any type of rigid material, for example, a plastic, resin, metal, or the like. As shown in FIG. 17, the sensor mount 1711 may be rigidly coupled to at least one or both of the stress members 1712 and/or 1713. Therefore, motion of the stress members 1712 and 1713 may be transferred to (and thereby measured by) the sensor 1710. While two stress members 1712 and 1713 are shown in FIG. 17, in alternative embodiments, any number of stress members may be included in the seismic cable. The sensor 1710 housing and/or a mount 1711 comprising the sensor 1710 may be coupled to any one or more of the available stress members.

In one embodiment of the invention, the sensor 1710 housing may optionally be enclosed in a region with pressure and particle motion release boundaries, for example, an air chamber 1714 as illustrated in FIG. 17. The air chamber 1714 may provide an additional layer of insulation for the noise sensor 1710 from particle motion associated with reflected seismic/acoustic waves. When an air chamber 1714 is used, the air chamber may be embedded in a sensor mount 1711 coupled to one or more stress members. Alternatively, the air chamber 1714 containing the noise sensor 1710 may be directly coupled to the stress members.

In one embodiment of the invention, the sensor 1710 may be decoupled from the streamer skin 1730. For example referring to FIG. 17, the sensor mount 1711 is shown as not being in contact with the streamer skin 1730. This may be accomplished, for example, by suspending the sensor mount and sensor in a fill liquid which has the same specific gravity as sea water, thereby causing the sensor and/or sensor mount to float within the streamer. In the embodiment of FIG. 17, the sensor and mount are shown as rigidly attached to the stress members. As the stress members are under tension when towed, they may tend to remain stationary relative to the motion of the surrounding medium. On the other hand, the streamer skin and fill material, being neutrally buoyant and not attached to the stress members in the vicinity of the sensor and mount, may be free to move along with the motion of the surrounding medium. In one embodiment, an outer size of the mount is chosen relative to the inner size of the streamer skin and relative to the expected magnitude of streamer skin excursions such that sensor mount-skin contact is substantially avoided. By ensuring that the sensor 1710 housing, mount 1711, and/or air chamber 1714 are not in contact with the streamer skin, which may transfer acoustic energy, embodiments of the invention further improve fidelity of the noise sensor 1710 by avoiding acoustic energy from seismic waves from being transferred thereto.

The sensor 1720 may be configured to measure, either directly or indirectly, particle motion associated with seismic/acoustic waves. As shown in FIG. 17, the sensor 1720 housing may be placed in a sensor mount 1721 in one embodiment. The sensor mount 1721 may be made of a similar material as the sensor mount 1711, e.g., plastic, resin, etc. In alternative embodiments, the sensor mount may be omitted. In any case, the sensor 1720 may be either directly or indirectly (e.g., via the sensor mount 1721) coupled to the streamer skin 1730. By allowing the sensor 1720 to be coupled to the streamer skin, particle motion associated with seismic acoustic waves may be transferred to the sensor 1720 via the streamer skin, as will be described in greater detail below.

In one embodiment of the invention, the sensor 1720 may be placed in between a pair of spacer members 1741 and 1742. The spacer members may define a length 1731 of the streamer skin 1730 associated with the sensor 1720. The spacer members may be made from any suitable materials including metals, plastics, resin, and the like. In one embodiment, the spacer members 1741 and 1742 may be clamped to the streamer skin by using external bands or by selecting diameters such that spacer-skin interference is ensured. The clamp separation distance is chosen in order to tune the resonant frequency of the section 1731 of the streamer skin 1730 and ensure the acoustic mobility of the sensor 1720.

In one embodiment, the length 1731 may be specifically selected such that the resonant frequencies for the section 1731 of the streamer skin 1730 are matched with frequencies associated with the seismic acoustic waves expected to be measured by the sensor 1720. The resonant frequencies of the streamer section 1731 may be associated with the length of the section 1731. Streamer sections are commonly modeled in the industry as tensioned continuous beams, which are governed by the following partial differential equation:

$$EI\frac{\partial^4 y}{\partial x^4} - T\frac{\partial^2 y}{\partial x^2} + \rho A\frac{\partial^2 y}{\partial t^2} = p(x, t),$$

Where E is the Young's Modulus, I is the cross-sectional moment of inertia, y(x,t) is the transverse displacement, x is the longitudinal coordinate, T is the tension, $\rho A$ is the beam mass per unit length (density times area) of the streamer section 1731; and p(x,t) is the external force per unit length acting on the streamer section 1731. When this equation is solved for natural frequency, the result depends on the length of the streamer section 1731 according to the following equation:

$$\omega_n^2 = \left(\frac{n\pi}{l}\right)^2 \frac{T}{\rho A} + \left(\frac{n\pi}{l}\right)^4 \frac{EI}{\rho A},$$

Where $\omega_n$, is the $n^{th}$ natural frequency mode and I is the section length of interest.

In one embodiment of the invention, the region between the spacer members 1741 and 1742 may be filled with an acoustically transparent medium 1750—for example, water, gel, foam, or the like. Seismic waves approaching the sensor 1720 encounter the acoustically transparent streamer skin 1730 and the acoustically transparent medium 1750 and excite the sensor 1720 with minimal energy lost to reflections. The spacer members 1741 and 1742 may be spaced far enough apart that the resonant frequency of the streamer section 1731 is below the lowest frequency of interest. The streamer section 1731 containing the sensor 1720, thereby being acoustically mobile, may move in phase with the incident acoustic particle motion. The sensor mount 1721, being coupled to the streamer skin 1730, may also move in phase with the acoustic particle motion and transfer this motion to the sensor 1720 inside it. Therefore, the particle motion sensor 1720 is capable of measuring motion of particles associated with seismic acoustic waves. Typically, the construction and composition of the sensor 1720, mount 1721, and skin 1730 may be selected so that they are neutrally buoyant; but this parameter can be adjusted if a non-unity gain is desired with respect to the ratio of particle motion to sensor motion.

Figure 18:
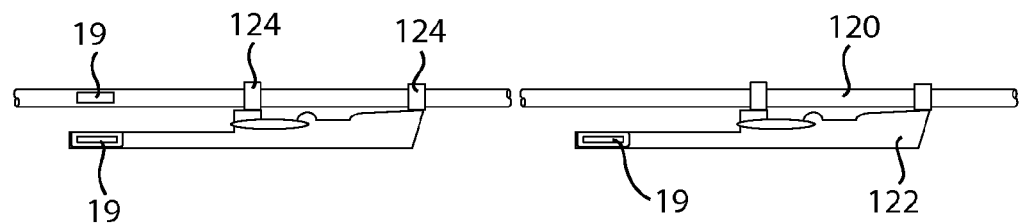
FIG. 18 shows a sensor portion of a seismic system embodiment that can be mounted within a streamer cable or within a cable-positioning device.
Figure 19:
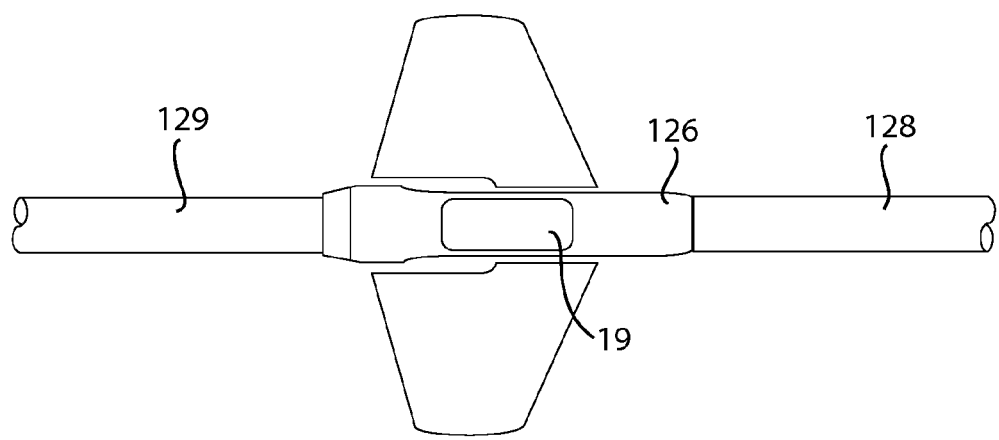
FIG. 19 shows a cable-positioning device embodying features of the invention that is connected in line between fore and aft streamer sections that can house the sensor portion of the seismic system.

As shown in FIG. 18, the sensor portion of the seismic system 19 can be mounted within a streamer cable 120 or within a cable-positioning device, such as a cable-leveling or cable-steering bird 122, rotatably attached to the streamer by collars 124. As shown in FIG. 19, a cable-positioning device 126 connected in line between fore and aft streamer sections 128, 129 can house the sensor portion of the seismic system 19. Clearly, the sensors can be mounted in other devices attachable in, on, or to a streamer, an ocean-bottom cable, or an autonomous node.

Figure 20:
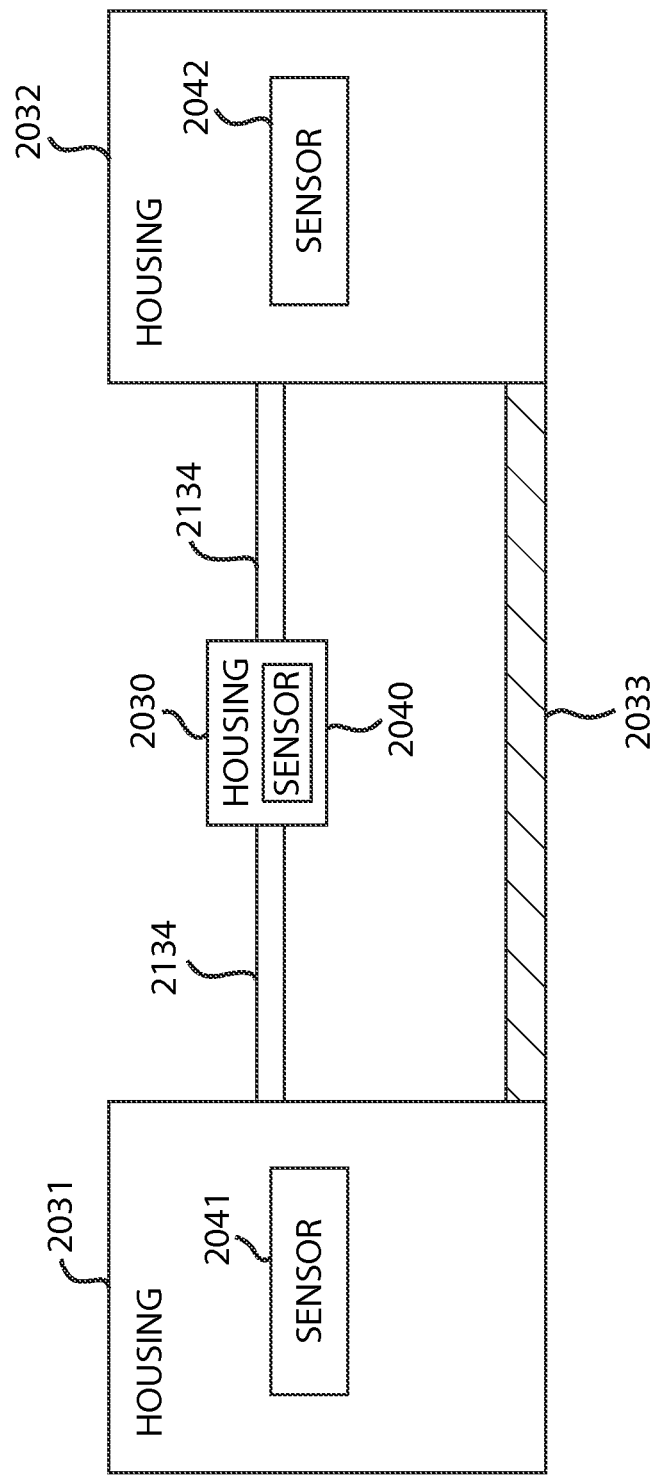

FIG. 20 illustrates another embodiment wherein the seismic system of FIG. 7 and/or FIG. 17 is implemented in an ocean bottom system, for example, an ocean bottom cable, ocean bottom node, or the like. As shown in FIG. 20, a first housing 2030 may include a first sensor 2040, which is configured to measure particle motion (and in some embodiments, noise). For example, the sensor 2040 and the housing 2030 may be built to be neutrally buoyant and may be held by a suspension system 2034 with a resonance below the lowest frequency of interest. A second sensor 2041 may be located in a second housing 2031 and may be configured to measure platform noise. Sources for platform noise in an ocean bottom system may include ocean currents, nearby drilling operations, geological seismic activities, noise from vessels passing over the system, and the like. In one embodiment, the second housing 2031 may be rigid and dense, thereby having poor acoustic mobility. Therefore, the second housing may substantially insulate the second sensor 2041 from being sensitive to seismic waves from a seismic source.

A third housing 2032 may include a hydrophone or group of hydrophones 2042. In one embodiment the third housing 2032 may be made of an acoustically transparent material, in order to ensure the proper function of the hydrophone; or in another embodiment, the hydrophone or hydrophones could be exposed. The second housing 2031 and third housing 2032 may be joined by a rigid connector 2033 in order to ensure the proper length of the acoustically mobile suspension system 2134.

A tri-axis accelerometer with response to dc similar to the VectorSeis sensor manufactured by ION Geophysical Corporation of Houston, Tex., U.S.A., is suitable for many embodiments of the invention. Since there is no dc component to the seismic wavelet, the dc response of the motion sensor is used to detect the orientation of the sensor relative to gravity. One axis of the sensor is designed to be in the known orientation of the streamer axis. Since the streamer axis orientation is known and the gravity vector is measured, the orientation of the sensor, and thus the arriving sensed seismic wavelet, can be electronically rotated relative to gravity so that up-going seismic wavelets can be accepted and down-going seismic wavelets rejected.

Any sensors that detect motion can be used. The sensors can be any motion sensors responsive to position, velocity, or acceleration. For instance, a gimbaled first geophone, as described by Tenghamn et al. in U.S. Pat. No. 7,239,577, can be combined with a second geophone, packaged so that it has little or no response to an acoustic wave and the same response to streamer motion, to achieve the desired result. Piezoelectric accelerometers can be used, as long as they have adequate sensor performance.

If the sensor cannot determine its own orientation, separate orientation sensors can be included in the sensor systems. Alternatively, mechanical means—such as a gimbal system—can be used to fix the sensors in a known orientation. Winged devices attached to the streamer, sometimes referred to as birds, can also be used to force the sensor into a desired orientation.

While the foregoing is directed to embodiments of the present invention, other and further embodiments of the invention may be devised without departing from the basic scope thereof, and the scope thereof is determined by the claims that follow.

What is claimed is:

1. A seismic sensor cable system, comprising:
a cable;
a first sensor configured to measure motion of the cable, wherein the first sensor is coupled to one or more stress members of the cable and decoupled from a skin of the cable to avoid acoustic energy from seismic waves being transferred thereto, wherein measurement of the motion of the cable by the first sensor substantially excludes particle motion associated with the seismic waves; and
a second sensor coupled to the skin of the cable and configured to measure the particle motion associated with the seismic waves, wherein the particle motion is transferred to the second sensor via the skin of the cable, moving in phase thereto.

2. The seismic sensor cable system of claim 1, wherein the second sensor is also configured to measure cable motion, wherein response of the one or more stress members to acoustic waves is recorded.

3. The seismic sensor cable system of claim 1, wherein the second sensor is configured to omit the cable motion, wherein the second sensor has negligible response to acoustic waves.

4. The seismic sensor cable system of claim 1, wherein the first sensor is enclosed in a region with pressure and particle motion release boundaries configured to insulate the first sensor from the particle motion associated with the seismic waves.

5. The seismic sensor of claim 1, wherein the first sensor is de-coupled from the skin of the cable by suspending the first sensor in a fill material selected to avoid the acoustic energy from the seismic waves being transferred thereto.

6. The seismic sensor cable system of claim 1, wherein the second sensor is placed in an acoustically mobile streamer section between a pair of streamer components clamped to the skin of the cable, the acoustically mobile streamer section moving in phase with the particle motion.

7. The seismic sensor cable system of claim 6, wherein a length of a section of the cable defined by the pair of streamer components is selected such that the acoustically mobile streamer section resonates at a resonant frequency chosen in relation to the seismic waves, the resonant frequency matching a frequency associated with the seismic waves or below a predefined frequency of interest thereof, said section of the cable thereby being acoustically mobile.

8. The seismic sensor cable system of claim 1, wherein the second sensor is coupled to the skin of the cable between a pair of spacer members defining a length of a section of the cable, the length chosen to ensure acoustic mobility, wherein the section of the cable moves in phase with the particle motion.

9. The seismic sensor cable system of claim 1, wherein the first sensor and second sensor are embedded in sensor mounts, wherein the sensor mount of the first sensor does not contact the skin of the cable and the sensor mount of the second sensor is coupled to the skin of the cable.

10. The seismic sensor cable system of claim 1, wherein the first sensor and second sensor are inertial sensors having first and second outputs combined to diminish streamer motion response and increase acoustic wave response.

11. The seismic sensor cable system of claim 1, wherein the cable is one of a streamer cable, an ocean bottom cable, and a cable positioned statically at depth in a water column.

12. The seismic sensor cable of claim 1, wherein the first sensor and the second sensor are configured to have a substantially same response to motion of the cable and a different response to acoustic pressure waves.

13. A method for collecting seismic data, comprising:
    determining a first measurement with a first seismic sensor, wherein the first seismic sensor is coupled to one or more stress members of a seismic cable and configured to measure motion of a platform of a seismic sensor system, wherein the first seismic sensor is decoupled from a skin of the cable to avoid acoustic energy from seismic waves being transferred thereto and measurement of the motion of the platform by the first seismic sensor substantially excludes particle motion associated with the seismic waves;
    determining a second measurement from a second seismic sensor coupled to a skin of the seismic cable in a section having a length selected to ensure acoustic mobility, wherein the second seismic sensor moves in phase with the particle motion associated with the seismic waves, and is configured to measure the particle motion thereby; and
    combining the first measurement and second measurement to generate a noise-attenuated seismic data signal with attenuated response to the motion of the platform.

14. The method of claim 13, wherein the second measurement signal contains platform motion recorded as a response of the one more stress members to acoustic waves.

15. The method of claim 13, wherein the second measurement signal substantially excludes platform motion, the second sensor having negligible response to acoustic waves.

16. The method of claim 13, wherein the first sensor is de-coupled from the skin of the seismic cable by suspending the first sensor in a fill material selected to avoid acoustic energy from the seismic waves being transferred thereto.

17. The method of claim 13, wherein the second sensor is placed in an acoustically mobile streamer section between a pair of streamer components clamped to the skin of the cable, the streamer components defining a length of the section of the cable associated with the second seismic sensor.

18. The method of claim 17, wherein the length of the section of the cable defined by the pair of streamer components is selected so that the acoustically mobile streamer section resonates at a resonant frequency chosen in relation to the seismic waves, the resonant frequency matching a frequency associated with the seismic waves or below a predefined frequency of interest thereof, said section of the cable thereby being acoustically mobile.

19. The method of claim 17, wherein the second sensor is directly coupled to the skin of the cable.

20. The method of claim 13, wherein the first sensor and second sensor are embedded in one or more sensor mounts, wherein the sensor mount of the first sensor does not contact the skin of the cable and the sensor mount of the second sensor is coupled to the skin of the cable.

21. The method of claim 13, wherein the first sensor is enclosed in a chamber defining a region with pressure and particle motion release boundaries insulating the first seismic sensor from the particle motion associated with the seismic waves.

22. The method of claim 13, wherein the first sensor and second sensor are inertial sensors having first and second outputs, and further comprising combining the first and second outputs to diminish streamer motion response and increase acoustic wave response.

23. An ocean bottom seismic sensor system, comprising:
    a noise sensor configured to measure motion;
    a housing configured to substantially insulate the noise sensor from seismic waves from a seismic source, wherein measurement of motion by the noise sensor substantially excludes particle motion associated with the seismic waves;
    a particle motion sensor configured to measure particle motion associated with the seismic waves, wherein the particle motion sensor is coupled to an acoustically mobile suspension system configured to resonate below a predefined lowest frequency of interest of the seismic waves;
    a hydrophone disposed in a housing made of acoustically transparent material; and
    a rigid connector joining the housing of the noise sensor and the housing of the hydrophone, wherein the rigid connector is configured to ensure a length of the suspension system.

24. The ocean bottom seismic sensor system of claim 23, wherein the noise sensor and particle motion sensor comprise inertial sensors having first and second outputs combined to diminish streamer motion response and increase acoustic wave response.

25. The ocean bottom seismic sensor system of claim 23, further comprising an autonomous seismic node or ocean bottom seismic cable.

* * * * *